Patented Sept. 23, 1930

1,776,721

UNITED STATES PATENT OFFICE

HERMANN BOLLMANN, OF HAMBURG, GERMANY

METHOD OF PRODUCING UNIFORM PULVERULENT MIXTURES

No Drawing. Application filed May 21, 1929, Serial No. 364,955, and in Germany July 5, 1928.

The present invention concerns improvements in and relating to the production of pulverulent uniform mixtures, and more particularly to the production of such mixtures containing both powdery materials and tough, viscous or wax-like materials.

Considerable difficulty is associated in mixing tough, viscous or wax-like materials such, for example, as vegetable phosphatides, with pulverulent materials, so that a power is obtained in which the phosphatide is contained uniformly distributed, and which by this addition is not as a result, conglomerated.

Until now the production of such uniform mixtures was achieved in a manner such that the materials to be mixed were worked in a kneading machine of known construction. The desired end was in fact attained in this way, but required very much time and corresponding expenditure of power.

I have now found that a much quicker and better mixture results by operating in the following manner:

The pulverulent material, for example meal, and the viscous waxy material, for example vegetable lecithin are brought together in the desired proportions, for example, 85 parts of meal and 15 parts of vegetable phosphatide. Both the constituents are placed in a mixing machine and the materials are mixed for a short time. There is thereby produced a rough non-uniform mixture, in which each particle of the meal is not uniformly mixed with a uniform amount of the vegetable phosphatide, due to the tough, viscous and waxy properties of the latter, but only a slight mixing of the particles of the phosphatides with the bulk of meal. The rough non-uniform mixture so prepared is then subjected to pressure, if desired with heating, in a suitable press. For this step worm presses through which the mass is passed, are particularly suited. In this way a solid material is obtained which, without expenditure of much power, for example, in a disintegrating mill, may be reduced to the desired degree of sub-division.

The pressing operation (accompanied by some heating if desired) causes the waxy phosphatides to become distributed or diffused substantially uniformly throughout the entire mass of the meal or other solid material, so that by grinding this pressed material, a powder is produced, which contains the phosphatide material uniformly distributed therethrough, so that by taking out a small quantity of the material, from any part of the mass, the proportionate amount of the phosphatides are found present therein.

In this manner it is possible to obtain from meal, lime, cocoa and other pulverulent materials uniform phosphatide containing powders. In place of the phosphatide, other materials of the same or similar properties may be converted with pulverulent materials to a uniform powder.

I claim:—

1. Method of producing an uniform pulverulent mixture from meal and phosphatides, consisting in subjecting the constituents of the mixture to a rough mixing, compressing the mixture to cause the phosphatides to become distributed throughout the mass of meal, and disintegrating the product so obtained to the requisite order of sub-division.

2. A method of producing uniform pulverulent mixtures of plant lecithin and powdered solid material which does not readily react chemically with the lecithin, which comprises subjecting the plant lecithin and the powdered material to a rough mixing, compressing the mixture, if desired with heating, whereby the lecithin becomes distributed throughout the mass, in a substantially uniform manner and disintegrating the product so obtained to the requisite order of subdivision.

3. A method of producing uniform pulverulent mixtures of plant lecithin and meal, which comprises subjecting the plant lecithin and the meal to a rough mixing, compressing the mixture, if desired with heating, whereby the lecithin becomes distributed throughout the mass, in a substantially uniform manner and disintegrating the product so obtained to the requisite order of subdivision.

4. Method of producing uniform pulverulent mixtures from waxy, viscous, tough vegetable phosphatide, and a solid material which is chemically inert with respect to such phosphatide, consisting in subjecting the constituents of the mixture to a rough mixing, then compressing the mixture, if desired with heating, whereby the phosphatide becomes distributed throughout the mass of said solid material, and disintegrating the compressed product to the required degree of fineness.

In testimony whereof I affix my signature.

HERMANN BOLLMANN.